US007444853B2

United States Patent
Lee et al.

(10) Patent No.: US 7,444,853 B2
(45) Date of Patent: *Nov. 4, 2008

(54) IMPULSE EVENT SEPARATING APPARATUS AND METHOD

(75) Inventors: Yongbeom Lee, Seoul (KR); Xuan Zhu, Yongin-si (KR); Jaewon Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 360 days.

This patent is subject to a terminal disclaimer.

(21) Appl. No.: 11/270,622

(22) Filed: Nov. 10, 2005

(65) Prior Publication Data

US 2006/0100828 A1     May 11, 2006

(30) Foreign Application Priority Data

Nov. 10, 2004    (KR) ...................... 10-2004-0091451

(51) Int. Cl.
*G01M 13/00* (2006.01)

(52) U.S. Cl. ..................................................... 73/11.04
(58) Field of Classification Search ...... 73/11.01–11.04
See application file for complete search history.

(56) References Cited

U.S. PATENT DOCUMENTS

| 5,552,770 | A | * | 9/1996 | McMaster .................... 340/550 |
| 5,729,145 | A | * | 3/1998 | Blades ........................ 324/536 |
| 5,831,936 | A | | 11/1998 | Zlotnick et al. |
| 6,182,018 | B1 | | 1/2001 | Tran et al. |
| 6,249,749 | B1 | | 6/2001 | Tran et al. |
| 6,907,368 | B2 | * | 6/2005 | Bechtold et al. ............... 702/78 |
| 6,947,449 | B2 | * | 9/2005 | Olivier ........................ 370/497 |
| 7,234,340 | B2 | * | 6/2007 | Wen et al. ................... 73/11.04 |

* cited by examiner

*Primary Examiner*—Max Noori
(74) *Attorney, Agent, or Firm*—Staas & Halsey LLP

(57) ABSTRACT

An impulse event separating method, and an apparatus to perform the method, the method including dividing an input signal into frame units and dividing each frame into a plurality of frequency sub-bands; obtaining a power variation and phase variation of the signal of each of the frequency sub-bands, and detecting a plurality of local onsets using the power variation and the phase variation; obtaining a global onset from the local onsets and triggering a plurality of event components using the local onsets and the global onset; tracking and combining the event components in each of the frequency sub-bands to form events; and determining whether the events comprise an impulse event with reference to an impulse event property.

29 Claims, 5 Drawing Sheets

IMPULSE EVENT SEPARATING APPARATUS AND METHOD

CROSS-REFERENCE TO RELATED APPLICATIONS

This application claims the benefit of Korean Patent Application No. 10-2004-0091451, filed on Nov. 10, 2004, in the Korean Intellectual Property Office, the disclosure of which is incorporated herein by reference.

BACKGROUND OF THE INVENTION

1. Field of the Invention

The present invention relates to an impulse event separating apparatus and method, and, more particularly, to a method of separating an impulse event from a successive sound, and an apparatus to perform the method.

2. Description of the Related Art

An impulse event, that is, an impact sound, is generated by mechanical interaction between objects, and has a short duration and a high intensity. The impact sound occurs suddenly in background sounds which are relatively stable and can be estimated. According to signal processing theory, the impact sound can be modeled into a zero-state impulse response of a linear system.

Examples of impact sounds include a simplex sound, such as the sound made by striking glass with a rod, and a complex sound, such as an explosive sound or the sound made when a coin falls to the floor.

The impact sound generally has an onset stage and an attenuating stage. In the onset stage, the physical event making the impact sound has a short duration and a high intensity. If the onset is detected, the start of the impact sound can be determined.

Generally, an ideal impulse signal is linearly attenuated in the attenuating stage. That is, the energy of a log function substantially has a linear attenuation slope. According to this property, the event can be tracked, and the energy distribution of the impact sound can be calculated.

Since the successive sounds in which the impact sound and the non-impact sound are mixed generally share frequency bands and overlap each other in the time domain, the impact sound must be distinguished from these successive sounds. Conventional techniques for separating the impact sound include U.S. Pat. Nos. 6,249,749, 6,182,018 and 5,831,936.

SUMMARY OF THE INVENTION

The present invention provides an impulse event separating method, and an apparatus to perform the method, of detecting an onset from an input audio signal in each frequency band, detecting an event using the onset, and determining whether the event is an impulse event.

Additional aspects and/or advantages of the invention will be set forth in part in the description which follows and, in part, will be apparent from the description, or may be learned by practice of the invention.

According to an aspect of the present invention, there is provided an impulse event separating apparatus comprising a preprocessing unit which divides an input signal into frame units; an event detecting unit which divides the frame into a plurality of frequency sub-bands, obtains power variations and phase variations of the signals of each of the sub-bands to detect a plurality of onsets, and detects a plurality of events using the detected onsets; an event buffer which stores the detected events; and an impulse event determining unit which determines whether the detected events comprise an impulse event with reference to an impulse event property.

According to another aspect of the present invention, there is provided an impulse event separating method comprising dividing an input signal into frame units and dividing each frame into a plurality of frequency sub-bands; obtaining a power variation and phase variation of the signal of each of the frequency sub-bands, and detecting a plurality of local onsets using the power variation and the phase variation; obtaining a global onset from the local onsets and triggering a plurality of event components using the local onsets and the global onset; tracking and combining the event components in each of the frequency sub-bands to form events; and determining whether the events comprise an impulse event with reference to an impulse event property.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
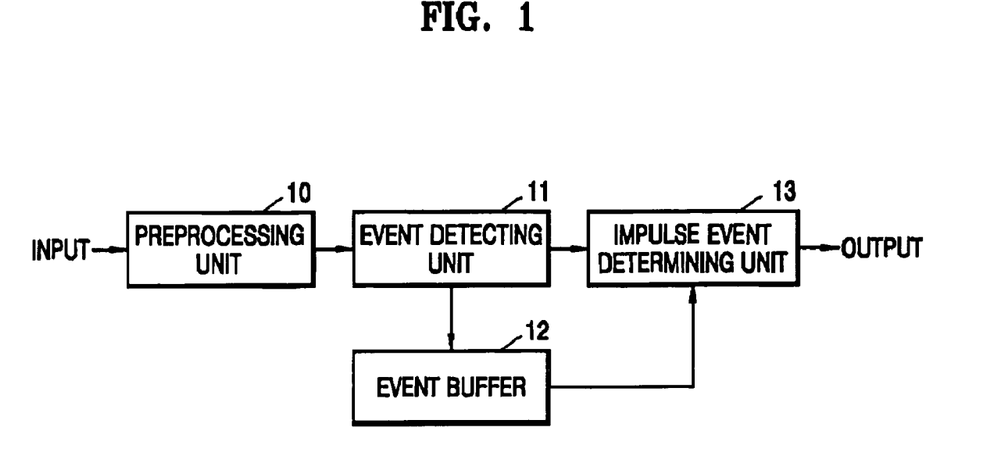
FIG. 1 is a block diagram illustrating an impulse event separating apparatus according to an embodiment of the present invention.

FIG. 1 is a block diagram illustrating an impulse event separating apparatus according to an embodiment of the present invention. The impulse event separating apparatus includes a preprocessing unit 10, an event detecting unit 11, an event buffer 12, and an impulse event determining unit 13.

The preprocessing unit 10 divides an input audio signal into frame units, extracts a frequency band corresponding to an impulse event from each frame, and samples and converts the frequency band into a digital signal.

The event detecting unit 11 detects an event from the digital signal, and the event buffer 12 buffers the event detected in the event detecting unit 11. The impulse event determining unit 13 determines whether the event stored in the event buffer 12 is an impulse event, and separates the impulse event therefrom.

Figure 2:
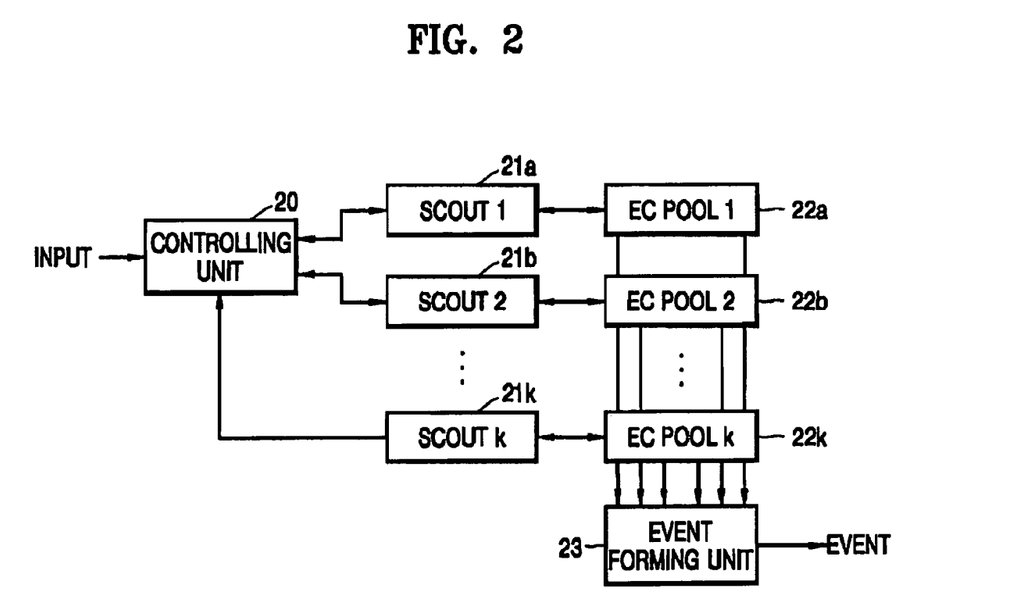
FIG. 2 is a block diagram illustrating an event detecting unit shown in FIG. 1.

FIG. 2 is a block diagram of the event detecting unit 11 in FIG. 1. The event detecting unit 11 includes a controlling unit 20, a plurality of scouts 21a, 21b, ... 21k, a plurality of event component (EC) pools 22a, 22b, ... 22k, and an event forming unit 23.

The controlling unit 20 divides a frame output from the preprocessing unit 10 into a plurality of sub-bands and outputs them to the scouts 21a, 21b . . . 21k. The scouts 21a, 21b, . . . 21k detect local onsets from the corresponding sub-bands and output the local onsets to the controlling unit 20. At this time, the controlling unit 20 combines the local onsets detected in the scouts 21a, 21b, . . . 21k to form a global onset, and feeds the global onset back to the scouts 21a, 21b . . . 21k.

Here, each sub-band may be uniformly divided from the frequency band of the corresponding frame, and may be divided according to the output of a cochlear filter. The impulse response of the cochlear filter can be approximated through a Gammatone filter function expressed by Equation 1.

$$g(t)=t^{n-1} \exp(-2\pi bt)\cos(2\pi f_0 t+\phi) \qquad (1)$$

Wherein $f_0$ is the center frequency of the cochlear filter, n is a degree, $\phi$ is a phase difference, and b is a constant.

The controlling unit 20 may include a cochlear filter bank having the impulse response as shown by Equation 1 for the center frequency of each sub-band, and can provide the output thereof to each of the scouts 21a, 21b . . . 21k. The controlling unit 20 may further include a synchronizing unit so as to simultaneously drive the scouts 21a, 21b, . . . 21k.

The EC pools 22a, 22b, . . . 22k include a plurality of ECs which are triggered using the local onsets detected in the scouts 21a, 21b, . . . 21k. Each EC is triggered in response to the power suddenly being increased in the corresponding sub-band, and is stopped in response to the power falling below a zero event component level. Here, the zero event component level refers to the power of an acoustical background which exists when no EC exists in the corresponding sub-band.

The event forming unit 23 combines the ECs triggered in the EC pools 22a, 22b, . . . 22k to form the event. Also, the event forming unit 23 subtracts the event from the signal output from the preprocessing unit 10 and outputs a zero event, that is, a whole background sound.

Figure 3:
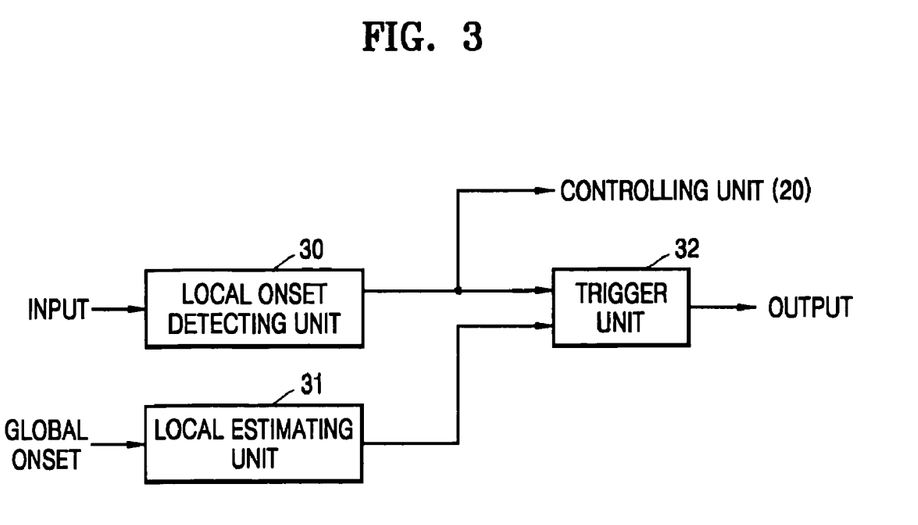
FIG. 3 is a block diagram illustrating a scout shown in FIG. 2.

FIG. 3 is a detailed block diagram illustrating one of the scouts 21a, 21b, . . . 21k in FIG. 2. The scout includes a local onset detecting unit 30, a local estimating unit 31, and a trigger unit 32. The impulse event starts at the onset. That is, the ECs of the EC pools 22a, 22b, . . . 22k start at the onset. Accordingly, by detecting every onset, the start of every event can be detected.

Figure 4:
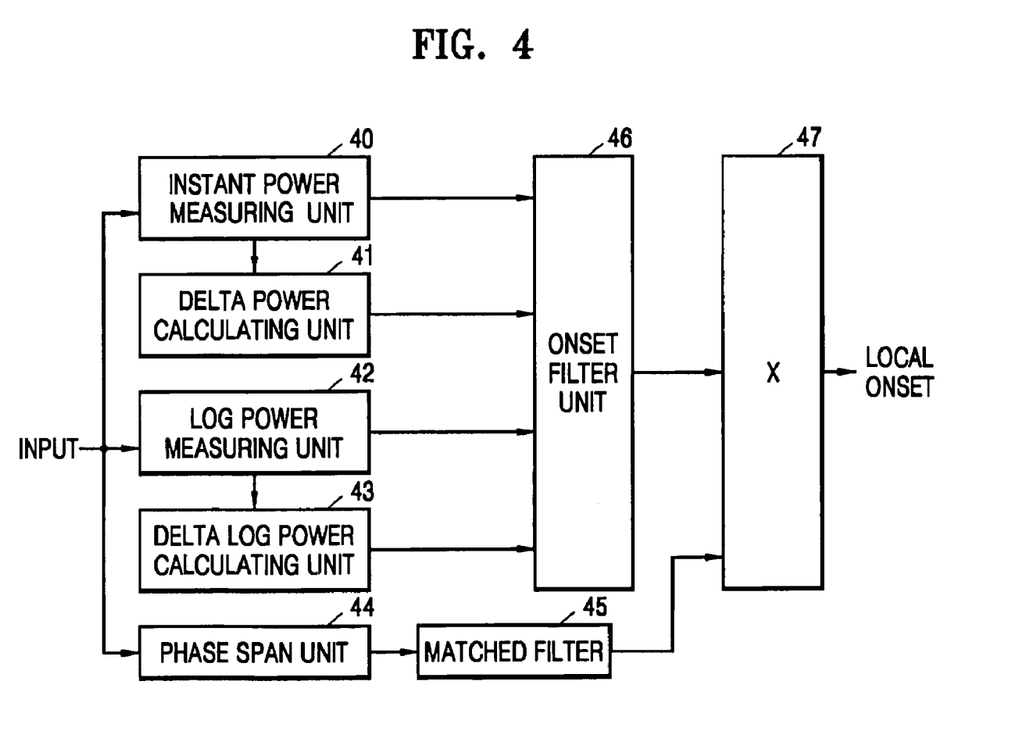
FIG. 4 is a block diagram illustrating a local onset detecting unit shown in FIG. 3.

The local onset detecting unit 30 detects the local onset from an amplitude spectrum and a phase spectrum of the signal input from the controlling unit 20. FIG. 4 is a detailed block diagram of the local onset detecting unit 30. The local onset detecting unit 30 includes an instant power measuring unit 40, a delta power calculating unit 41, a log power measuring unit 42, a delta log power calculating unit 43, a phase span unit 44, a matched filter 45, an onset filter unit 46, and a multiplier 47.

If the amplitude spectrum of the input signal of the frame (t) is $\{Y(t,1), \Lambda, Y(t, N)\}$, the instant power measuring unit 40, the delta power calculating unit 41, the log power measuring unit 42, and the delta log power calculating unit 43 can respectively obtain the power, the delta power, the log power, and the delta log power, expressed by Equation 2, from the amplitude spectrum.

$$Power(t) = \frac{1}{N}\sum_{n=1}^{N} |Y(t,n)|^2 \qquad (2)$$

$$DPower(t) = Power(t) - Power(t-1)$$

$$LogPower(t) = \log\left(\frac{1}{N}\sum_{n=1}^{N} |Y(t,n)|^2\right)$$

$$DLogPower(t) = LogPower(t) - LogPower(t-1)$$

Wherein power(t) is the instant power, DPower(t) is the delta power, Logpower(t) is the log power, and DlogPower(t) is the delta log power.

The instant power and the log power represent the trace of the absolute value of the energy, and the delta power and the delta log power include the variation of the energy between frames. These values increase rapidly in the onset, with the delta log power increasing particularly rapidly.

The phase span unit 43 measures the phase variation of the linear phase component in the sub-band frequency domain. According to the Fourier analysis theory, the signal is expressed by the amplitude spectrum and the phase spectrum. The amplitude encodes the frequency content of the signal, and the phase represents a temporal or spatial structure. Accordingly, the temporal location of the onset can be expressed by the slope of the linear phase component. If an unwrapped phase spectrum adjacent to the frame (t) is $\{\phi(t,0), \ldots, \phi(t,N/2)\}$, the unwrapped phase spectrum can be approximated by the linear function as shown by Equation 3.

$$\hat{\phi}(t,n)=\alpha(t)\cdot n+\hat{\phi}(t,0), n=0,\ldots,N/2 \qquad (3)$$

Wherein $\alpha(t)$ is the slope of the linear phase component.

According to Equation 3, the phase span of the frame (t) is calculated by Equation 4.

$$PhaseSpan(t)=\alpha(t)N/2 \cong \phi(t,N/2)-\phi(t,0) \qquad (4)$$

Since the general phase span of the onset is linear, it can be expressed by Equation 5.

$$p(n) = \begin{cases} n\pi, & 0 \leq n < N/2 \\ 0, & \text{otherwise} \end{cases} \qquad (5)$$

Since the matched filter 44 is used for matching the pattern, it has the impulse response expressed by Equation 6.

$$h_{mf}(t) = \begin{cases} c\pi(N/2-t), & 0 \leq t < N/2 \\ 0, & \text{otherwise} \end{cases} \qquad (6)$$

The output of the matched filter for the phase span result of Equation 5 is expressed by the conjugate of Equations 5 and 6 as shown by Equation 7.

$$FilteredPhaseSpan(t) = \frac{cN}{2}\sum_{n=0}^{N/2-1} \left(\frac{N}{2}-n\right)\pi\alpha(t-n) \qquad (7)$$

Wherein c is a constant.

The constant (c) has a value of $c=24/(N-2)(N-1)/N\pi^2$, so that the maximum of the result of Equation 7 becomes 1.

The onset filter unit 46 emphasizes the variation degree of the input signal, and includes a plurality of secondary filters to which primary filters having a delay-add filter shape are connected. The onset filters respectively filter the outputs of the instant power measuring unit 40, the delta power calculating unit 41, the log power calculating unit 42, and the delta log power calculating unit 43. Each onset filter has the impulse response expressed by Equation 8.

$$h_{of}(t) = Ae^{t/T_1} - Be^{t/T_2} \quad (8)$$

Wherein $A = 1 - e^{-1/T_1}$, $B = 1 - e^{-1/T_2}$, and $T_1 < T_2$.

The onset filter having the impulse response shown by Equation 8 is sensitive to the input which varies relatively rapidly.

The multiplier 47 multiplies a plurality of filter outputs of the onset filter unit 46 by the output of the matched filter 45 to output the local onset for the corresponding sub-band.

Figure 5:
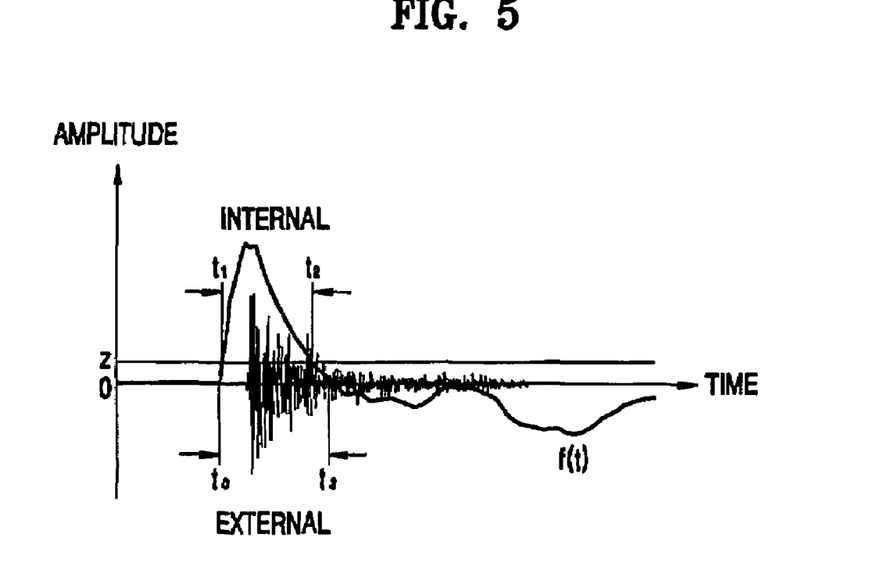
FIG. 5 defines an external and internal domain so as to combine a plurality of local onsets.

The controlling unit 20 detects the global onset from the plurality of local onsets detected by the scouts 21a, 21b, ... 21k. FIG. 5 defines an external and internal domain so as to combine the plurality of local onsets.

Referring to FIG. 5, f(t) represents the output of the onset filter which is applied to the output of the log power calculating unit 42. The points $t_0$ and $t_3$ represent the zero points of f(t) closed to the main peak, and $t_1$ and $t_2$ represent the zero points of f(t)-z closed to the main peak. Here, z is a constant which is selected experimentally. The section $(t_0, t_3)$ is defined as the external domain, and the section $(t_1, t_2)$ is defined as the internal domain. The controlling unit 20 combines two local onsets to make one global onset when the external domain of one local onset overlaps with the internal domain of the other local onset.

If the global onset is made, the controlling unit 20 sends notice that the global onset is made to the local estimating unit 31 of the scout which does not detect the local onset. The local estimating unit 31 receives the notice and detects the power of the corresponding sub-band at the global onset time. If the power is greater than an estimate, a notice trigger EC is triggered by the trigger unit 32. The local estimating unit 31 estimates the recent power before the global onset time.

The trigger unit 32 triggers the EC according to the notice output from the local estimating unit 31 or the local onset output from the local onset detecting unit 30.

The EC pools 22a, 22b, ... 22k include the plurality of ECs triggered by the trigger unit 32. The duration and the power during the duration of each EC are estimated. Each EC becomes either a masking state or a masked state, and one EC of the masking state exists in one sub-band. At this time, any ECs other than the masking EC become the masked state. If a new EC is triggered by the trigger unit 32, it becomes the masking state.

The EC pools 22a, 22b, ... 22k also include a zero EC. The zero EC sets a zero event component level for each sub-band and represents the acoustic background in that sub-band. The zero EC becomes the masking state if it is the only EC in the sub-band, and otherwise becomes masked by the other ECs. If the zero EC is in the masking state, the local estimated value rapidly converges to the acoustic background of the corresponding sub-band. The power of the zero EC is the zero event component level, and the other ECs disappear when their power falls below the zero event component level. The instant power of the masked EC is estimated in the local estimating unit 31 at the corresponding instant, and the instant power of the masking EC is the value obtained by subtracting the sum of the powers of the masked ECs from the total power of that frequency band.

The event forming unit 23 tracks the ECs included in the EC pools 22a, 22b, ... 22k and estimates the power of the EC at every instant and the end point of each EC to obtain the power function of each EC.

Figure 6:
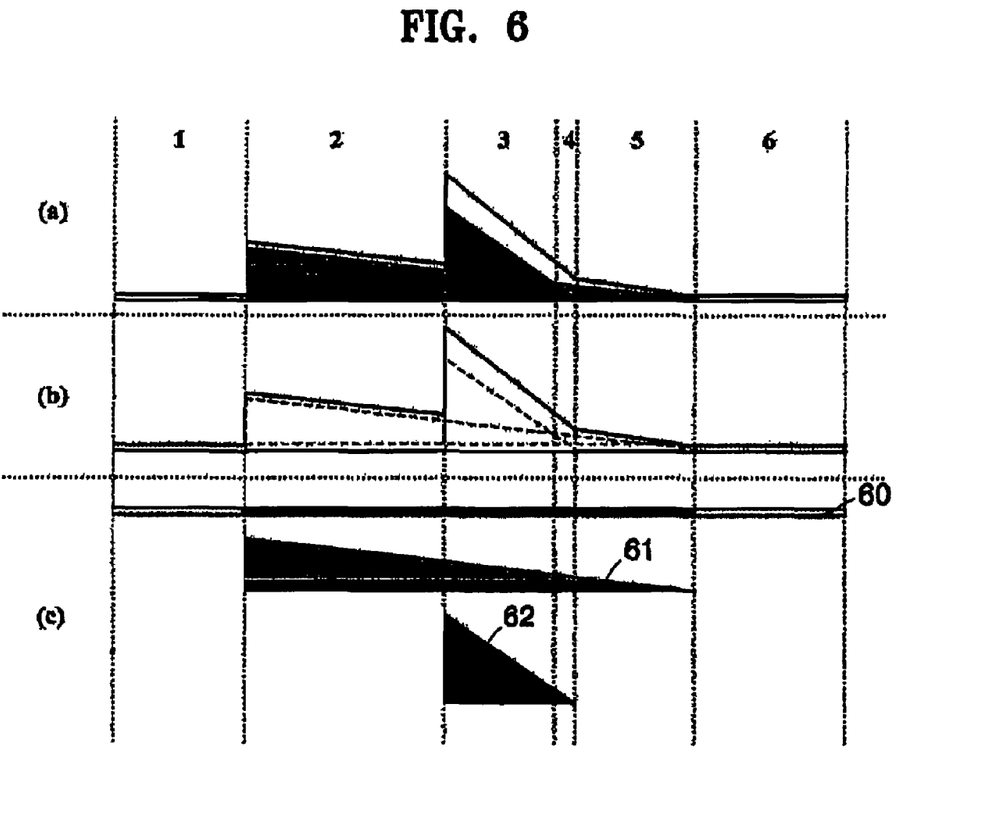
FIG. 6 illustrates an example of tracking ECs by a frequency sub-band.

FIG. 6 illustrates an example of tracking ECs by a frequency sub-band. FIG. 6(a) illustrates two impulse event components (A, B), and B overlaps with the middle of A. In FIG. 6(b), the solid line indicates the local data of the corresponding sub-band, and the dotted line indicates the estimated power of each EC. FIG. 6(c) illustrates the result of the event forming unit 32 separating the data of FIG. 6(a) into three ECs, that is, the zero EC 60, the EC (A) 61, and the EC (B) 62. In section 1, the impulse EC does not exist, and thus the zero EC becomes the masking EC, and the power of the zero EC becomes the zero event component level. In section 2, the EC (A) occurs, and the zero EC is masked. In section 3, the EC (B) occurs and becomes the masking state, and thus the EC (A) and the zero EC are masked. Since the power of the EC (B) becomes lower than that of the EC (A) in section 4, the EC (B) disappears. In section 5, the EC (A) becomes the masking EC, until the power of the EC (A) becomes lower than the zero event component level at the end of section 5, and thus the EC (A) disappears. In section 6, the zero EC becomes the masking state again.

Accordingly, the tracking of the event component is accomplished according to the variation of the power of the masking ECs at every instant. The event forming unit 23 determines the duration with reference to the start point and the end point of each EC, and forms the event if the above-mentioned event tracking process is completed. That is, referring to FIGS. 6A(a) through 6(c), the time at which the power of the masking EC becomes greater than the zero event component level is the start point of the event, and the time at which the power of the masking EC becomes less than the zero event component level is the end point of the event.

The event buffer 12 temporarily stores the events formed in the event forming unit 23.

The impulse event determining unit 13 determines whether the events stored in the event buffer 12 are impulse events or not, with reference to a common property of the impulse events.

In order to identify impulse events, two examining processes are needed. Between them, it is determined whether the power of the detected onset increases rapidly. This is performed in the local onset detecting unit 30, which searches the start point of as many of the impulse events as possible. However, three tests are used to identify impulse events in a given time period [a, b]. First, whether the instant power function of the signal between the onset and the power peak point reaches a sufficiently large value at time (b); second, whether the instant power function has largely increased during the time period [a, b]; and third, whether the time period [a, b] is sufficiently small.

Here, determining whether the instant power function has largely increased must satisfy the following requirement for damped oscillation.

The log power of the section during which the signal is attenuated is substantially linear from the peak to a noise level. This pattern is equal to the attenuation pattern of the single mode damped oscillation. The attenuation pattern of the damped oscillation can be expressed by Equation 9.

$$\frac{d(LogPower(t))}{dt} < 0, \quad \frac{d^2(LogPower(t))}{dt^2} = 0 \quad (9)$$

If the power peak time is $t_p$, the noise level is n1, and the time when the power falls below the noise level is $t_e$, then using these parameters, the inequality of Equation 9 can be quantitated using the power function expressed by Equation 10.

$$z(t) = c(131\, t)^\lambda \quad (10)$$

Here, c is a constant determined by $z(t_p)$=Power($t_p$) and $z(t_e)$=Power($t_e$), $\lambda$ is a value for representing the impulsiveness of the sound, and z(t) is the instant power.

The function of Equation 10 satisfies the inequality of Equation 9 when $\lambda$ is a value between 0 and 1. If $\lambda \gg 1$, it is difficult to be considered as an impulse event. An ideal $\lambda$ approaches 1, and most impulse events are not greater than 3.

Figure 7A:
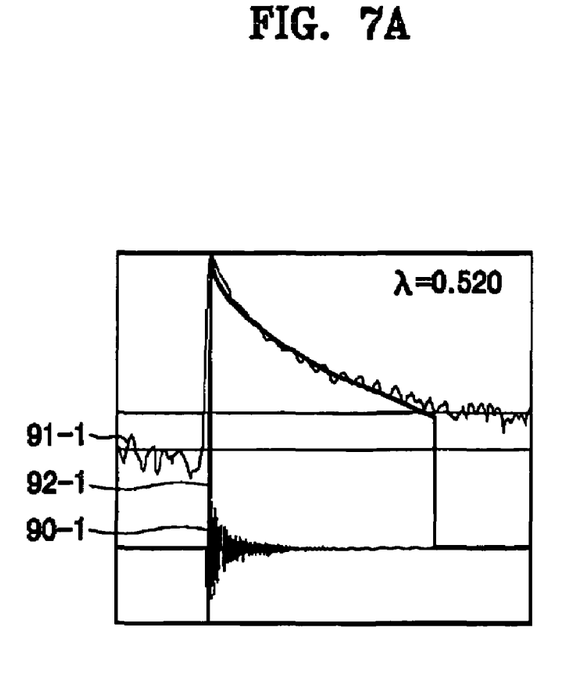
FIGS. 7A through 7D illustrate the result of approximating a log power signal of an input signal.
Figure 7B:
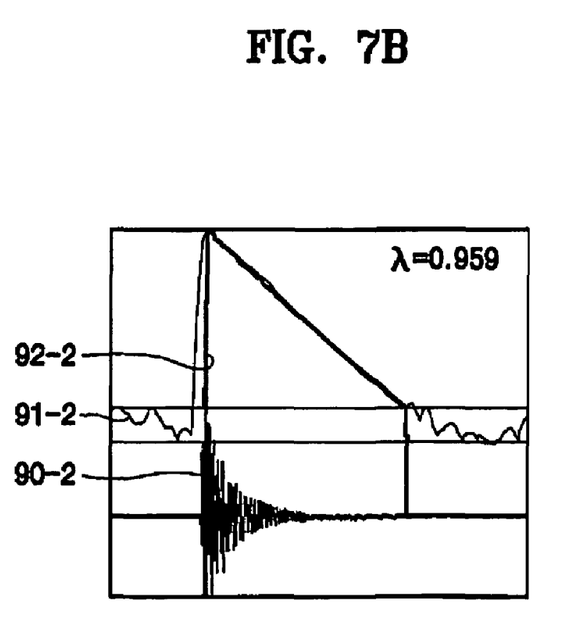
Figure 7C:
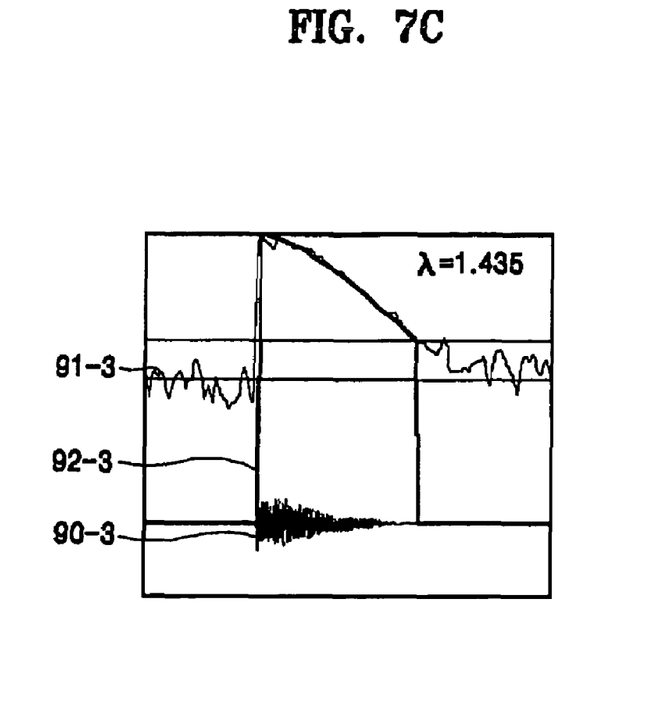
Figure 7D:
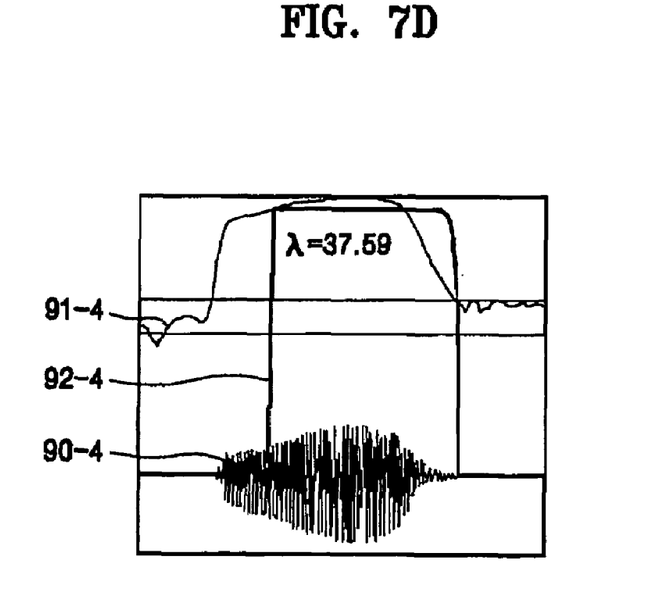

FIGS. 7A through 7D illustrate the result of approximating a log power signal of an input signal according to Equation 10. Reference numerals 90-1, 90-2, 90-3, and 90-4 indicate original signals, and 91-1, 91-2, 91-3, and 91-4 respectively illustrate the log powers of the original signals. 92-1, 92-2, 92-3, and 92-4 illustrate the results of approximating the log power signals. It is noted that the approximated log power signal 0 for the corresponding log power between the noise level set to each signal and a threshold value higher than the noise level and $\lambda$ is approximated to 0.520, 0.959, 1.435, and 37.59 for the log power which is attenuated from the onset to the threshold value. FIG. 7B illustrates an ideal impulse event in which $\lambda$ approaches 1. FIGS. 7A and 7C illustrate the impulse events. In FIG. 7D, the power level increases rapidly. However, FIG. 7D is difficult to be considered as an impulse event, because $\lambda \gg 1$. Actually, FIG. 7D illustrates a speech signal, not an impulse event.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

According to the present invention, an impulse event can be separated by separating the successive audio stream into frequency bands to detect local onsets, forming the events using the detected onsets, and examining the log powers of the events. Since the present invention determines an impulse event, for example, a glass-breaking sound, a gunshot, or footsteps, from the sound generated in surroundings, it can be applied to a security system and can diagnose a defect of a structure through acoustic diagnosis.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An impulse event separating apparatus, comprising:
    a preprocessing unit which divides an input signal into frame units;
    an event detecting unit which divides each frame into a plurality of frequency sub-bands, obtains power variations and phase variations of the signals of each of the sub-bands to detect a plurality of onsets, and detects a plurality of events using the detected onsets;
    an event buffer which stores the detected events; and
    an impulse event determining unit which determines whether the detected events comprise an impulse event with reference to an impulse event property.

2. The apparatus according to claim 1, wherein the event detecting unit comprises:
    a controlling unit which divides the frame into the frequency sub-bands and detects a global onset from local onsets;
    a plurality of scouts which respectively detect the local onsets using the power variations and the phase variations of the signals of the frequency sub-bands, trigger a first type of event components, output the local onsets to the controlling unit, and trigger a second type of event components;
    an event component pool comprising the first and second types of event components triggered by each of the scouts; and
    an event forming unit which tracks and combines the event components to form the detected events.

3. The apparatus according to claim 2, wherein the controlling unit uniformly divides the frame into the frequency sub-bands.

4. The apparatus according to claim 2, wherein the controlling unit comprises a plurality of cochlear filters having impulse responses which are approximated by a Gammatone function.

5. The apparatus according to claim 2, wherein each of the scouts comprises:
    a local onset detecting unit which detects the local onset using the power variation and the phase variation of the signal of the frequency sub-band;
    a local estimating unit which measures a power of the signal of the frequency sub-band at the time that the global onset is detected; and
    a trigger unit which triggers the first type of event component by the local onset, and triggers the second type of event component in response to the power measured in the local estimating unit being greater than a predetermined estimated value.

6. The apparatus according to claim 5, wherein the local onset detecting unit comprises:
    a power variation detecting unit which detects the power and the power variation of the signal of the frequency sub-band;
    a phase variation detecting unit which detects the phase variation of the signal of the frequency sub-band; and
    a multiplier which multiplies the power variation by the phase variation to output the local onset.

7. The apparatus according to claim 6, wherein the power variation detecting unit comprises:
    an instant power measuring unit which measures the power of the signal of the frequency sub-band;
    a delta power calculating unit which calculates a variation from a the power of the previous frame using the measured power;
    a log power measuring unit which measures a log power obtained by taking a log of the signal of the frequency sub-band;
    a delta log power calculating unit which calculates a variation of a log power of the previous frame using the log power; and an onset filter unit which filters the power, the power variation, the log power, and the variation of the log power to emphasize the variation degree.

8. The apparatus according to claim 7, wherein the onset filter unit comprises a secondary filter having an impulse response expressed by the equation $$h_{of}(t)=Ae^{t/T_1}-Be^{t/T_2},$$

for the power, the power variation, the log power, and the variation of the log power,
wherein $A=1-e^{-1/T_1}$, $B=1-e^{-1/T_2}$ and $T_1<T_2$.

9. The apparatus according to claim 6, wherein the phase variation detecting unit comprises:
a phase span unit which approximates the phase of the signal of the frequency sub-band by a linear function and detects the variation degree of the approximated phase; and
a matched filter which matches a pattern of the detected phase variation.

10. The apparatus according to claim 2, wherein if a domain between zero points on the basis of a main peak in a curve representing the power of the signal of the frequency sub-band output from the scout is defined as an external domain, and a domain between zero points in a curve adjusted by a predetermined value from the curve is defined as an internal domain, the controlling unit detects the global onset by combining two local onsets to make one global onset in response to the external domain of one local onset overlapping with the internal domain of the other local onset.

11. The apparatus according to claim 1, wherein the impulse event determining unit determines whether the events comprise an impulse event based on a power increment degree and a power attenuation pattern during a predetermined time period of the impulse event.

12. The apparatus according to claim 11, wherein the power attenuation pattern is determined such that when the power z(t) of the signal of the frequency sub-band is expressed by the equation $$z(t)=c(1-t)^\lambda,$$

$\lambda$ satisfies a predetermined condition,
wherein $t_p$ is the power peak time of the signal of the frequency sub-band, $t_e$ is the time that the power of the signal of the frequency sub-band falls below a noise level, c is a constant determined by $z(t_p)=\text{Power}(t_p)$ and $z(t_e)=\text{Power}(t_e)$, and $\lambda$ is a value for determining whether the sound is an impulse event.

13. An impulse event separating method, comprising:
dividing an input signal into frame units and dividing each frame into a plurality of frequency sub-bands;
obtaining a power variation and phase variation of the signal of each of the frequency sub-bands, and detecting a plurality of local onsets using the power variation and the phase variation;
obtaining a global onset from the local onsets and triggering a plurality of event components using the local onsets and the global onset;
tracking and combining the event components in each of the frequency sub-bands to form events; and
determining whether the events comprise an impulse event with reference to an impulse event property.

14. The method according to claim 13, wherein the dividing each frame comprises uniformly dividing the frame into the frequency sub-bands.

15. The method according to claim 13, wherein the dividing each frame comprises dividing the frame using a plurality of cochlear filters having impulse responses which are approximated by a Gammatone function.

16. The method according to claim 13, wherein obtaining the power variation of the signal of each sub-band comprises:
obtaining a log power by taking a log of the signal of the sub-band and a power of the signal of the sub-band;
obtaining a variation of the signal of the sub-band for a previous frame and a variation of the log power of the signal of the sub-band for the previous frame; and
filtering the power, the power variation, the log power, and the variation of the log power to emphasize the variation degree.

17. The method according to claim 16, wherein filtering the power, the power variation, the log power and the variation of the log power is accomplished by a secondary filter having the impulse response expressed by the equation $$h_{of}(t)=Ae^{t/T_1}-Be^{t/T_2},$$

for the power, the power variation, the log power, and the variation of the log power,
wherein $A=1-e^{-1/T_1}$, $B=1-e^{-1/T_2}$ and $T_1<T_2$.

18. The method according to claim 13, wherein obtaining the phase variation comprises:
approximating the phase of the signal of the frequency sub-band by a linear function and detecting the variation of the approximated phase; and
matched-filtering the measured phase variation.

19. The method according to claim 13, wherein obtaining the global onset comprises:
defining a domain between zero points on a basis of a main peak in a curve representing the power of the signal of the frequency sub-band output from the scout as an external domain, and a domain between zero points in a curve adjusted by a predetermined value from the curve as an internal domain; and
combining two local onsets to make one global onset in response to the external domain of one local onset overlapping with the internal domain of the other local onset.

20. The method according to claim 13, wherein the tracking of the event components is accomplished according to the variations of the powers of the event components which become a masking state in response to the event components being masking states or masked states according to the powers of the event components.

21. The method according to claim 20, wherein forming the events is accomplished by detecting the time between the power of the masking event component becoming greater than a predetermined level and the power of the masking event component becoming less than a predetermined level, and setting this as the duration of the events.

22. The method according to claim 13, wherein the determining the events comprises determining whether the events are an impulse event based on a power increment degree and a power attenuation pattern during a predetermined time period of the impulse event.

23. The apparatus according to claim 22, wherein the power attenuation pattern is determined such that when the power z(t) of the signal of the frequency sub-band is expressed by the equation $$z(t)=c(1-t)^\lambda,$$

$\lambda$ satisfies predetermined condition,
wherein t is the power peak time of the signal of the frequency sub-band, t is the time that the power of the signal of the frequency sub-band falls below a noise level, c is a constant determined by $z(t_p)=\text{Power}(t_p)$ and $z(t_e)$=Power($t_e$), and $\lambda$ is a value for determining whether the sound is an impulse event.

24. A computer-readable storage medium having embodied thereon a computer readable code of a computer program to implement an impulse event separating method, the method comprising:

dividing an input signal into frame units and dividing each frame into a plurality of frequency sub-bands;

obtaining a power variation and phase variation of the signal of each of the frequency sub-bands and detecting a plurality of local onsets using the power variation and the phase variation;

obtaining a global onset from the local onsets and triggering a plurality of event components using the local onsets and the global onset;

tracking and combining the event components in each of the frequency sub-bands to form events; and determining whether the events comprise an impulse event with reference to an impulse event property.

25. A method of separating an impulse event, the method comprising:

detecting a plurality of local onsets according to power variations and phase variations of frequency sub-bands of frames of a signal;

obtaining a global onset from the local onsets and triggering a plurality of event components;

tracking and combining the event components to form events; and separating the impulse event in response to the events comprising the impulse event.

26. The method of claim 25, wherein the event components in each of the frequency sub-bands are combined to form the events.

27. The method of claim 25, further comprising dividing the signal into frames and dividing each of the frames into the frequency sub-bands.

28. The method of claim 27, wherein the power and phase variations are determined by comparing a power and phase of a current frame with a power and phase of a previous frame.

29. A method of separating an impulse event, the method comprising:

detecting onsets in frequency sub-bands of a signal;

tracking and combining event components from the onsets in the frequency sub-bands to form events; and separating the impulse event from the signal in response to the events combining to form the impulse event.

* * * * *

UNITED STATES PATENT AND TRADEMARK OFFICE
CERTIFICATE OF CORRECTION

PATENT NO. : 7,444,853 B2
APPLICATION NO. : 11/270622
DATED : November 4, 2008
INVENTOR(S) : Yongbeom Lee et al.

It is certified that error appears in the above-identified patent and that said Letters Patent is hereby corrected as shown below:

Column 8, Line 58, after "from" delete "a".

Column 10, Line 56, change "apparatus" to --method--.

Column 11, Line 4, after "thereon" delete "a".

Signed and Sealed this

Fifteenth Day of September, 2009

David J. Kappos
*Director of the United States Patent and Trademark Office*